United States Patent [19]

Yoshioka et al.

[11] 4,200,562
[45] Apr. 29, 1980

[54] SIZING AGENT FOR USE IN MAKING PAPER

[75] Inventors: Shigehiko Yoshioka, Akashi; Kaoru Okada, Kobe, both of Japan

[73] Assignee: Seiko Kagaku Kogyo Co., Ltd., Hyogo, Japan

[21] Appl. No.: 888,644

[22] Filed: Mar. 21, 1978

[30] Foreign Application Priority Data

Jun. 10, 1977 [JP] Japan .................................. 52/69247

[51] Int. Cl.$^2$ ............................................. C08L 33/14
[52] U.S. Cl. ...................... 260/29.6 RW; 162/168 N; 162/168 NA; 526/202; 526/203; 526/273; 526/292; 526/312
[58] Field of Search .............. 260/29.6 RW, 29.6 RB; 526/202, 203, 273, 292, 312; 162/168 N, 168 NA

[56] References Cited

U.S. PATENT DOCUMENTS

| | | | |
|---|---|---|---|
| 3,678,098 | 7/1972 | Lewis | 526/292 |
| 3,694,393 | 9/1972 | Lewis | 260/29.6 |
| 3,702,799 | 11/1972 | Lewis | 162/168 NA |
| 3,847,856 | 11/1974 | Mueller | 260/29.6 RB |

*Primary Examiner*—Paul R. Michl
*Attorney, Agent, or Firm*—Stevens, Davis, Miller & Mosher

[57] ABSTRACT

A neutral sizing agent of emulsion type to be added to paper pulp for facilitating the disaggregation and recovery of waste paper in making paper including paper board, said sizing agent being produced, for example, by dispersing in an aqueous emulsifying dispersion medium a polymerizable hydrophobic monomer such as styrene or 2-ethylhexyl methacrylate by using as an emulsifying dispersing agent a copolymer having units of one or more monomers given by the formula

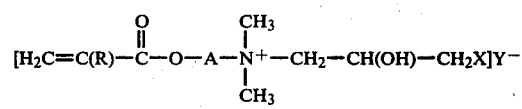

or

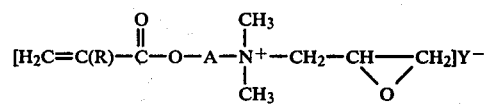

wherein
R is H or CH$_3$,
X is a halogen atom,
A is a (C$_2$-C$_6$) alkylene group, and
Y is an anion, and a monomer given by the formula

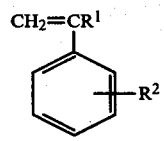

wherein R$^1$, R$^2$ are H or CH$_3$, and then subjecting the resultant dispersion to a radical emulsion polymerization.

2 Claims, No Drawings

SIZING AGENT FOR USE IN MAKING PAPER

The present invention relates to a sizing agent for paper making and, more particularly, to a so-called sizing agent which does not notably add to the wet strength of paper even when the use of a bonding agent is limited.

DESCRIPTION OF PRIOR ART

It is a well-known fact that, as a loading material for making paper, calcium carbonate has many advantageous features not only in its properties, but also from a viewpoint of economy. In the meantime, since the rosin sizing agent which is commonly used in paper making must be adapted for use under acid conditions, a paper making process in the use of calcium carbonate as a loading material cannot use the rosin sizing agent.

Nowadays, several "neutral" sizing agents which permit the sizing in an alkaline zone have been proposed. For example, the U.S. Pat. No. 3,694,393 discloses a method of preparing such a neutral agent as follows:

"A method of adapting for use, as in making paper and the like, a copolymer of (1) about 0.25% to 99.5% by weight of a monomeric material comprising a predominant amount of a compound of the formula

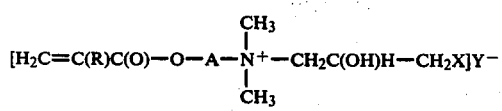

and the compound of the formula

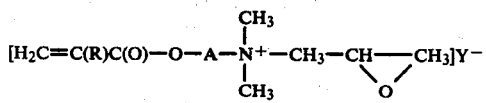

the symbols in the two formulas being defind as
R is hydrogen or methyl,
X is iodine, bromine, or chlorine,
A is a ($C_2$-$C_6$) alkylene group having at least two carbon atoms in a chain between the adjoined O and N atoms or A may be a polyoxyethylene group of the formula $(CH_2CH_2O)_xCH_2CH_2$ wherein x is at least 1, and
Y is an anoin, the latter compound being present in an amount up to about one-third the weight of the former with (2) at least one other monoethylenically unsaturaed monomer having a group of the formula

by bringing the copolymer at a solids concentration of about 25% to about 10% to a pH of 9 to 12 and maintaining it at that pH for 1 to 5 hours at 5°–50° C."

However, according to said patent, since the sizing agent is used as a wet strength modifier, it renders considerably difficult the disaggregation and recovery of brokes produced in a paper mill. Generally in paper mills, since about 30% of ordinarily produced paper are recycled as brokes to the stock for reuse, it has been desired, in making paper which does not intentionally require a wet strength, to provide such a sizing agent that does not particularly add to the wet strength.

DESCRIPTION OF THE INVENTION

According to the present invention, a neutral sizing agent for paper making is provided and, more specifically, provided is a neutral sizing agent of emulsion type which facilitates the disaggregation of brokes without increasing the wet strength when it is added to paper in process.

The sizing agent for paper making according to the present invention is obtained by dissolving in an aqueous medium a water-soluble cationic copolymer compound having principal units of a monomer comprising a predominant amount of a compound given by the formula

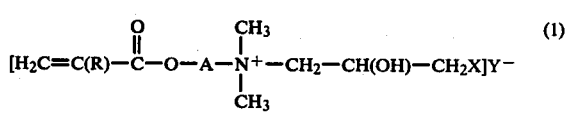

and a minor amount of a compound given by the formula

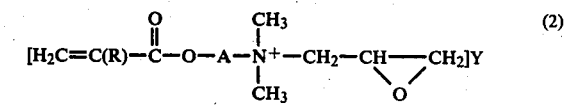

wherein
R is H or $CH_3$,
X is a halogen atom,
A is a ($C_2$–$C_6$) alkylene group, and
Y is an anion such as halogen ion ($Cl^-$, $Br^-$ or $I^-$) or an anion of an acid salt such as phosphate, acid phosphate, sulfate, bisulfate, methyl sulfate, carboxylate, sulfonate, sulfamate, acetate, formate, oxalate, acrylate, or α-methacryloxyacetate or, more, preferably, an anion of an acid having a ionization constant of 5.0 or less, namely, an anion of acid which is dissociated at a hydrogen ion and a monomer given by the formula

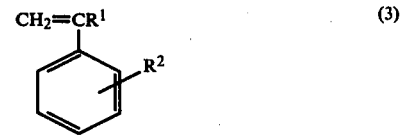

wherein
$R^1$ and $R^2$ is H or $CH_3$,
dispersing therein a polymerizable hydrophobic monomer such as styrene or 2-ethylhexyl methacrylate, and then subjecting the resultant dispersion to a radical emulsion polymerization.

Also, the sizing agent according to the present invention is obtained by dispersing a polymerizable hydrophobic monomer in an aqueous medium containing as a principal emulsifying dispersing agent a water-soluble cationic copolymer of the copolymer of the monomers given by said formulas (1) and (2) with the monomer of said formula (3) and as an auxiliary emulsifying dispersing agent a compound given by the formula $$R^3-O-(CH_2-CH_2-O)_nSO_3M \quad (4)$$

wherein
R³ is a higher aliphatic or cycloaliphatic hydrocarbon residue,
n is an integer equal to or larger than 2, and
M is a monovalent metallic element or NH₄,
and then subjecting the resultant dispersion to a radical emulsion polymerization.

As disclosed in the U.S. Pat. No. 3,678,098, the monomer given by said formula (1) can be produced by causing a hydrogen acid salt of a basic ester given by the formula $$H_2C=C(R)-C(O)-O-A-N(CH_3)_2 \cdot HY$$

wherein
R is H or CH₃,
A may be a (C₂-C₆) alkylene group interposed between adjacent oxygen and nitrogen atoms or a polyoxyethylene group given the formula $(CH_2CH_2O)_xCH_2CH_2$ wherein x is 1 to 11 or more, and
Y is a halogen or an anion of acid,
to react with epihalohydrin under acid conditions at room temperature to 80° C., said basic ester being produced by copolymerizing an aromatic vinyl hydrocarbon such as styrene, a methacrylate such as dimethylamino methacrylate and a nitrile compound such as azobisisobutyronitrile. In this case, the total amount of reactants is not converted into the monomer of the formula (1), but some units of the formula (2) are produced along therewith. The relative amounts of the monomers (1) and (2) will vary depending on the reaction but, in typical, cases, they will be present in roughly equivalent amounts, and it is known that as the pH decreases the proportion of the monomer (2) decreases, while it increases at neutral or in the alkaline side.

The water-soluble cationic copolymer compound constituting the principal component of the emulsifying dispersing agent can be readily obtained by copolymerizing one or more monomers given by the aforesaid formula (1) or (2) with the monomer given by the formula (3). Alternatively, it can be produced by copolymerizing the monomer of the formula (3) with a monomer given by the formula $$H_2C=C(R)-\overset{O}{\underset{\|}{C}}-O-A-\overset{CH_3}{\underset{\underset{CH_3}{|}}{N}} \cdot HY \quad (5)$$

wherein
R is hydrogen or CH₃,
A is an (C₂-C₆) alkylene group, and
Y is an anion similar to that of the formula (1) and (2),
and then causing the resultant copolymer to react with epihalohydrin at 80°-85° C. under acid conditions and, more preferably, at pH 6 or less.

In producing the aforementioned copolymer, the principal component of the emulsifying dispersing agent according to the present invention may comprise a water-soluble cationic copolymer compound which is obtained by copolymerizing predominant amounts of those monomers given by said formulas (1), (2), (3) and (5) with a small amount of other copolymerizable monomers such as acrylic ester, methacrylic ester and aromatic vinyl hydrocarbon as added thereto as required.

For the purpose of use in the emulsifying dispersing agent according to the present invention, the water-soluble cationic copolymer compound predominantly comprising one or more monomers given by the formula (1) or (2) and the monomer given by the formula (3) is sufficient. However, the use of a small amount of a compound given by said formula (4) in combination with a predominant amount of said water-soluble cationic copolymer compound remarkably accelerates the emulsifying dispersion in the aqueous medium, as shown in the preferred embodiment (7) to be given later.

The sizing agent for making paper according to the present invention is of an emulsion type which is obtained by emulsion-dispersing polymerizable hydrophobic monomer in an aqueous medium containing a predominant amount of the emulsifying dispersing agent comprising the afore-mentioned water-soluble cationic copolymer compound and subjecting said monomer to a radical emulsion polymerization.

The radical emulsion copolymerization in an aqueous medium can be readily effected by a well-known polymerization technique and any special limit on the proportion of the emulsifying dispersing agent and the polymerizable hydrophobic monomer is not required for the radical emulsion polymerization reaction. However, in view of the stability of the emulsion as the sizing agent for making paper as well as from economical considerations, a proportion in the range of 1:1 to 1:4 (by weight) is preferred.

Typical examples of the polymerizable hydrophobic monomers which can be used in the radical emulsion polymerization reaction include styrene, styrene derivatives, acrylic ester, methacrylic ester and other hydrophobic vinyl compounds. The use of styrene or combination of styrene with 2-ethylhexyl acrylate is preferable.

The sizing agent for paper making of the present invention having the arrangement as mentioned hereinabove is of an emulsion type having a cationic property. Therefore, if it is added to anionic cellulose dispersed in water in the paper making process, it behaves as to be electrically adsorbed by the cellulose molecules spontaneously. Thus, if added to the raw material of paper, namely, pulp slurry, the sizing proceeds spontaneously without using a bonding agent such as a sulfuric acid bond. In this manner, the sizing agent according to the present invention can serve as a neutral sizing agent.

Further, as will be shown in the experiments 1 and 2 to be described later, one of the specially advantageous features of the paper making sizing agent according to the present invention consists in that a relatively large acount of addition thereof does not render difficult the disaggregation of brokes as being found in the conventional neutral sizing agent, despite the fact that it exhibits at a smaller amount of addition thereof a sizing effect superior to that of the conventional sizing agent.

Also, the paper making sizing agent according to the present invention can ensure almost perfect emulsification because the cationic copolymer compound is emulsion-polymerized with an equivalent or more amount of the polymerizable hydrophobic monomer and, therefore, it contributes to the reduction in the amount of use of a nitrogen compound which is generally expensive. In this sense, the sizing agent according to the present invention is economically justifiable for paper making.

Besides, the copolymerization of such a monomer as styrene eliminates the necessity of any special operation in the disaggregation of brokes.

PREFERRED EMBODIMENT 1

In a four-port flask provided with an agitator, thermometer, reflux condenser and dropping funnel, 1,000 g of isopropyl alcohol was prepared and heated to the reflux temperature. Then, a mixture of 780 g of styrene, 240 g of dimethylaminoethyl methacrylate and 20 g of azobisisobutyronitrile was dropped over two hours into said isopropyl alcohol kept at the reflux temperature. Thereafter, the mixture solution was subjected to polymerization reaction for five hours at 70°–80° C. to complete the reaction.

Then, after removing by evaporation about 750 g of isopropyl alcohol from the reactant solution, 92 g of acetic acid and 4,200 g of water were added thereto to be dissolved therewith and, further, 142 g of epichlorohydrin was added thereto and the resultant solution was caused to react for three hours at 80°–85° C. As a result, a water-soluble cationic copolymer compound A and a composition B corresponding to a neutral sizing agent of an aqueous solution containing about 20% of said water-soluble cationic copolymer compound A were obtained.

The copolymer compound A corresponds to the water-soluble cationic copolymer compound constituting the emulsifying dispersing agent to be used according to the present invention, while the composition B can be used as the emulsifying dispersing agent according to the present invention as it is.

In a four-port flask provided with an agitator, thermometer, reflux condenser and dropping funnel, 800 g of said composition B, 4 g of Hitenol (registered trade mark of Daiichi Kogyo Seiyaku Co., Ltd., Japan) as an emulsifying dispersing agent given by the formula $R^3-O-(CH_2-CH_2-O)_nSO_3NH_4$ wherein $R^3$ is a higher aliphatic or cycloaliphatic hydrocarbon residue, and n is an interger equal to or larger than 2, 700 g of tap water, 240 g of styrene, 80 g of 2-ethylhexyl acrylate and 24 g of aqueous solution of hydrogen peroxide ($H_2O_2$, 35%) were prepared and subjected to polymerization reaction for six hours at 70°–80° C. and, then, cooled to complete the reaction. As a result, 1,840 g of the neutral sizing agent of emulsion type I according to the present invention was obtained (25.8% solid content, viscosity 25 cps (30° C.)).

PREFERRED EMBODIMENTS 2 THROUGH 8

800 g of the composition B used in the preferred embodiment 1 was used as the emulsifying dispersing agent, while 700 g of tap water was used as an aqueous medium and a polymerizable hydrophobic monomer was dispersed therein. Then, the resultant dispersion was caused to react in a manner almost identical to the preferred embodiment 1. Consequently, emulsion type neutral sizing agents II through VIII were obtained from varied kinds and amounts of polymerizable hydrophobic monomers and polymerization initiators used.

The proportions of components and other polymerization conditions in the preferred embodiments 2 through 8 are summarized in Table 1 together with those in preferred embodiment 1.

Table 1*1

| Preferred embodiment No. | Emulsifying dispersing agent | | Polymerizable hydrophobic agent | | | Polymerization initiator | | Sizing agent |
|---|---|---|---|---|---|---|---|---|
| | Composition B | Hitenol*2 | Styrene | 2-ethylhexyl acrylate | Lauryl methacrylate | TBHPO*3 | $H_2O_2$*4 | |
| 1 | 800 | 4 | 240 | 80 | | | 24 | I |
| 2 | 800 | 4 | 240 | 80 | | 8 | | II |
| 3 | 800 | 4 | 160 | 160 | | 8 | | III |
| 4 | 800 | 4 | 320 | | | 8 | | IV |
| 5 | 800 | 8 | 240 | 80 | | 8 | | V |
| 6 | 800 | 4 | 240 | 80 | | 8 | | VI |
| 7 | 800 | 4 | 240 | | 80 | 8 | | VII |
| 8 | 800 | 6 | 360 | 120 | | 12 | | VIII |

*1 Values are given by weight in gram (g).
*2 Registered trade mark of Daiichi Kogyo Seiyaku Co., Ltd.
*3 Tertiary-butyl hydroperoxide
*4 35% aqueous solution Hereinafter, the results of test No. 1 performed for evaluating the sizing effect of the paper making sizing agents I through VIII according to the present invention obtained in the aforementioned preferred embodiments 1 through 8 will be presented.

TEST 1

To paper stock slurry (containing 2% of air-dried pulp and 0.6% of calcium carbonate) comprising beaten pulp (130 cc of L-BKP canadian Standard Freeness) and calcium carbonate as the loading agent), one of paper making sizing agents I through VIII according to the present invention obtained in the aforementioned preferred embodiments 1 through 8 so that 0.5% of solid content of the sizing agent exists per 100% of air-dried pulp. Then, the slurry was sized and fed into a manual sheeting tester (trade name, TAPPI Standard Sheet Machine, Toyo Seiki Co., Ltd., Japan) to obtain 45 g/m² of manually-sheeted paper in the usual manner.

For the purpose of comparison, the Stechihid sizing degrees of the resultant manually-sheeted paper are summarized in Table 2 along with those of manually-sheeted paper obtained in the same manner from the aforementioned composition B which can be regarded as a well-known neutral sizing agent.

Table 2

| Types of sizing agents | Stechihid sizing degree (sec.) |
|---|---|
| Composition B | 1.2 |
| I | 5.8 |
| II | 3.1 |
| III | 2.4 |
| IV | 1.7 |
| V | 2.6 |
| VI | 2.9 |
| VII | 1.7 |

Table 2-continued

| Types of sizing agents | Stechihid sizing degree (sec.) |
| --- | --- |
| VIII | 2.1 |

TEST 2

To prepare stock slurry (containing 2% of air-dried pulp and 0.6% of calcium carbonate) comprising beaten pulp (200 cc of L-BKP Canadian Standard Freeness) and calcium carbonate as loading material, varied amounts of the paper making sizing agent I according to the present invention obtained in the aforementioned preferred embodiment 1 were added and, also, a varied amounts of said composition B were added for the purpose of comparison to the same slurry, to manually sheet paper in the similar manner to the aforesaid Test 1.

The Stechihid sizing degree of the resultant manually sheeted paper and the results of the pen-writing test according to the TAPPI paper pulp testing method No. 12 and the disaggregation tests are summarized in Tables 3 through 5.

Table 3

(0.35% of solid content of sizing agent existing per 100% of air-dried pulp)

| Sizing agent | Stechihid sizing degree (sec.) | Pen-writing test | Disaggregation test (sec.) |
| --- | --- | --- | --- |
| Composition B | 0 | 0 | 30 |
| I | 0.5 | 1 | 30 |

Table 4

(0.5% of solid content of sizing agent existing per 100% of air-dried pulp)

| Sizing agent | Stechihid sizing degree (sec.) | Pen-writing test | Disaggregation test (sec.) |
| --- | --- | --- | --- |
| Composition B | 5.5 | 3 | 90 |
| I | 8.2 | 4 | 40 |

Table 5

(1% of solid content of sizing agent existing per 100% of air-dried pulp)

| Sizing Agent | Stechihid sizing degree (sec.) | Pen-writing test | Disaggregation test (sec.) |
| --- | --- | --- | --- |
| Composition B | 18.3 | 5 | 180 |
| I | 18.2 | 5–6 | 60 |

*In the disaggregation test, 2g of manually sheeted paper chips was immersed in 150cc of warm water at 50° C. and agitated by a mixer for home use, and the time elapsed until the paper chips were disaggregated and dispersed into their initial slurry state was measured.

What is claimed is:

1. A method of producing a sizing agent for making paper comprising the steps of:
   preparing a water-soluble cationic copolymer compound by reacting a first monomeric material containing a predominant amount of a compound of the formula

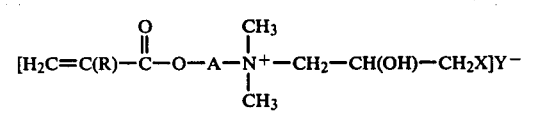

and a minor amount of a compound of the formula

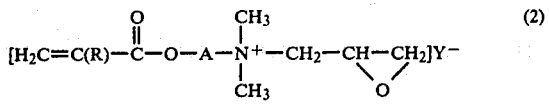

the symbols in the two formula being defined as
R is hydrogen or $CH_3$,
X is a halogen atom,
A is a ($C_2$–$C_6$) alkylene group,
Y is a halogen ion or an anion of acid salt such as phosphate, acid phosphate, sulfate, bisulfate, methyl sulfate, sulfonate, sulfamate, acetate, formate, oxalate, acrylate, or α-methacryloxyacetate,
with a second monomer of the formula

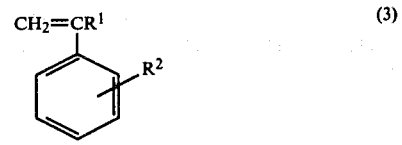

wherein
$R^1$ and $R^2$ are H or $CH_3$,
for about five hours at pH 6–5 and 80°–85° C.; and dispersing in an aqueous emulsion dispersion of said copolymer compound a polymerizable hydrophobic monomer of said second monomer at a ratio of 1:1–1:4 (by weight) causing the resultant dispersion to react at pH 6 or less and 70°–80° C. for six hours by using a polymerization initiator to subject said dispersion to a radical emulsion polymerization.

2. A method of producing a sizing agent for making paper comprising the steps of:
   preparing a water-soluble cationic copolymer compound by reacting a first monomeric material containing a predominant amount of compound of the formula

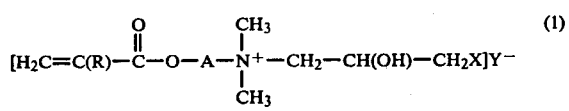

and a minor amount of a compound of the formula

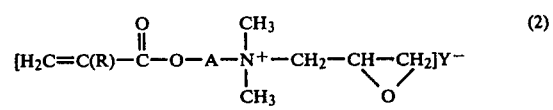

the symbols in the two formula being defined as
R is hydrogen or $CH_3$,
X is a halogen atom,
A is a ($C_2$–$C_6$) alkylene group,
Y is a halogen ion or an anion of acid salt such as phosphate, acid phosphate, sulfate, bisulfate, methyl sulfate, sulfonate, sulfamate, acetate, formate, oxalate, acrylate, or α-methacryloxyacetate,
with a second monomer of the formula

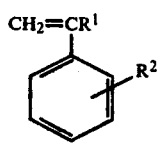
(3)

wherein
R¹ and R² are H or CH₃,
for about five hours at 80°–85° C.;
adding to said copolymer compound a small amount of an auxiliary emulsifying agent given by the formula $$R^3-O-(CH_2-CH_2-O)_nSO_3M \qquad (4)$$

wherein
R³ is a higher aliphatic or cycloaliphatic hydrocarbon residue,
n is an integer equal to or larger than 2, and
M is a monovalent metallic element or NH₄,
to prepare an aqueous emulsion dispersion; and adding to said aqueous emulsion dispersion a polymerizable hydrophobic monomer of said second monomer at the ratio of 1:1–1:4 (by weight) of said copolymer compound and subjecting the resultant dispersion to the polymerization reaction in the existence of aqueous solution of hydrogen peroxide for six hours at 70°–80° C.

* * * * *